United States Patent [19]

Hammond et al.

[11] 3,804,991

[45] Apr. 16, 1974

[54] TRUNK ARRANGEMENT WITH REMOTE ATTENDANT FACILITIES

[75] Inventors: Ronald Wayne Hammond, Reynoldsburg, Ohio; Robert Morris Morris, Brielle, N.J.; Richard Joseph Powondra, Lincroft, N.J.; Alexander Robert Ross, Freehold, N.J.

[73] Assignee: Bell Telephone Laboratories, Incorporated, Berkeley Heights, N.J.

[22] Filed: July 24, 1972

[21] Appl. No.: 274,570

[52] U.S. Cl. .............................. 179/26, 179/27 FF

[51] Int. Cl. .............................. H04m 7/14

[58] Field of Search ..... 179/26, 27 CA, 27 C, 27 B, 179/27 FA, 18 BC, 18 EA

[56] References Cited

UNITED STATES PATENTS

| | | | |
|---|---|---|---|
| 3,170,042 | 2/1965 | Giroud et al. | 179/27 CA |
| 3,248,486 | 4/1966 | Wadsworth | 179/26 |

*Primary Examiner*—Thomas W. Brown
*Attorney, Agent, or Firm*—C. H. Davis; F. W. Padden

[57] ABSTRACT

An arrangement for interconnecting incoming and outgoing trunks at a toll switching center under the control of a remote attendant switchboard is disclosed. The toll center portion of the arrangement includes a multiport transmission bridge with a two-way trunk segment connected to one port and a one-way segment connected to another port. A third port of the bridge is connected over a first transmission facility to the remote switchboard while the one-way trunk is connected directly to the remote switchboard over a similar but separate facility.

The attendant can receive or originate calls through the switching center using the first transmission facility and the two-way trunk or the attendant can originate calls using the one-way trunk under control of the second transmission facility. Upon receipt of answer supervision over the one-way trunk, the second transmission facility between the one-way trunk and the attendant is disconnected, leaving the two-way trunk segments and the attendant connected via the bridge. By signaling over the second transmission facility the attendant can ring forward on the one-way trunk or disconnect the first transmission facility.

14 Claims, 11 Drawing Figures

PATENTED APR 16 1974

3,804,991

SHEET 06 OF 10

PATENTED APR 16 1974 3,804,991

SHEET 09 OF 10

TRUNK ARRANGEMENT WITH REMOTE ATTENDANT FACILITIES

FIELD OF THE INVENTION

Although telephone switching networks have become increasingly automated, there occasionally arises a need for the services of an attendant to assist a customer in completing his call. It is generally more economical to locate the attendant facilities where they can advantageously serve many customers, yet, the best location for the attendant facilities might not coincide with the availability of personnel to operate the facilities. This is readily apparent in long distance and international telephone networks, wherein the automatic switching centers are usually located convenient to the end terminals of the long distance transmission routes. If these end terminals contain microwave facilities for radio relay links or earth station facilities for a satellite communications system, the location of the switching center will most likely be influenced by the topography of the land in order that the best transmission characteristics can be realized. The attendant switchboard associated with the switching center may, nevertheless, have to be located in a city remote from a switching center in order to take advantage of an existing labor market.

BACKGROUND OF THE INVENTION

In situations where the attendant switchboard is used to forward calls, locating the switchboard remote from the associated switching center introduces certain problems. For example, when a customer originates a call requiring assistance, the local originating office recognizes this and forwards the call over an attendant trunk to the remote switchboard. The attendant inserts a cord in a jack associated with the attendant trunk to learn the nature of the call and then inserts another cord in a jack associated with an outgoing toll trunk. Having seized the outgoing toll trunk, the attendant can then dial the called number and release her telephone set from the connection. The calling and called customers remain connected over her cord set and the attendant can reenter the connection in order to provide further assistance.

Exending the transmission path through the attendant switchboard in the manner just described introduces detrimental transmission losses, and while the losses can be overcome with amplifying equipment, this equipment is expensive and requires periodic maintenance.

In the alternative, arrangements have been proposed whereby an interoffice trunk circuit is used to directly forward the call from the calling office to the toll center but the trunk circuit also has access to a remote switchboard which is temporarily connected to the trunk during the interval that assistance is required. More specifically, the originating office determines that the call requires assistance and selects a special interoffice trunk which terminates at a distant toll office and also at a special link network. The link network is used to connect the trunk to a remote attendant position and to various service circuits, such as receivers and outpulsers. While the attendant is connected to the trunk, she can inform the customer of special charges, key a new called number into the system, etc. When the called customer answers, the attendant releases her position from the connection and the calling and called customers converse directly over the interoffice trunk.

The latter system is controlled by an elaborate central processoer which causes peripheral equipment to continuously scan the trunks to ascertain service requests. The processor also has access to a memory for storing the programs which control the system and the status of calls in progress. While these arrangements are generally suited for their intended purpose, they are costly and do not permit the attendant to reenter the connection at will. Furthermore, the attendant controls the release of her position from the connection, and while she is connected to the trunk, transmission may be degraded.

Accordingly, it is one object of out invention to provide a flexible and efficient trunk circuit which can be controlled from a remote attendant switchboard.

Another object of our invention is to provide a trunk circuit which can be controlled from a remote location without introducing unnecessary transmission losses in the completed connection.

It is a further object of our invention to provide a trunk circuit having bridged attendant access wherein a portion of the attendant transmission and control paths used for controlling the trunk is automatically disconnected when the called customer answers.

SUMMARY OF THE INVENTION

These and other objects are attained in the one illustrative embodiment of the invention wherein two halves of the central office portion of a trunk are independently controlled from a remote switchboard over two separate transmission and control systems in a manner which permits one system to be selectively disconnected from the connection while still allowing the attendant to monitor the connection over the other system without degrading transmission between the calling and called customers.

More specifically and in accordance with the disclosed embodiment of the invention, the intertoll trunk is divided into an A and B segment with the A segment connected to a switching frame serving domestic toll traffic and the B segment connected to a switch frame serving overseas toll traffic. In reality, the switch frames may very well be in the same or separate networks and they may carry the same type of toll traffic. For example, if the trunk arrangement is used for inward assistance calls for overseas service, the A segment would handle the overseas portion of the call while the B segment would serve the domestic portion. The trunk segments are interconnected via two ports of a multiport transmission bridge with the third port of the bridge being extended over the first transmission and control system to a remote attendant switchboard. The second transmission and control system directly couples the B segment of the trunk with the attendant switchboard.

The A and B segments of the trunk can be controlled independently over their respective transmission and control systems and the second system is automatically disconnected when the called customer answers, thereby leaving the attendant coupled to the connection over the first system via the transmission bridge. The attendant can reenter the connection to control the B segment of the trunk over the second transmission and control system by selectively operating keys at her switchboard. Operation of the keys at the remote switchboard causes multifrequency tones to be sent to the switching office where a special multifrequency receiver is attached to the trunk to convert the multifrequency tones into signals for controlling the B segment of the trunk in accordance with the particular multifrequency tones received.

BRIEF DESCRIPTION OF THE DRAWING

A better understanding of the arrangement contemplated will be had with the following description made with respect to the drawing in which.

BRIEF DESCRIPTION OF OPERATION

The present invention may be advantageously employed in automatic switching systems, such as the toll crossbar system disclosed in the U.S. Pat. No. 2,868,884 issued to J. W. Gooderham et al of Jan. 13, 1959. However, it is to be understood that the invention is not limited to use in that system but may be used in many other types of telephone systems.

The overall operation of the invention in the exemplary telephone system will now be described with reference to FIG. 1.

As set forth in greater detail in the Gooderham et al. patent, calls are switched through the toll switching system by means of two sets of crossbar switch frames, called incoming and outgoing links. Calls incoming to the office are received over incoming trunks, such as trunk 100 which is terminated on incoming link 101 and calls are forwarded to distant offices over outgoing trunks, such as trunk 102 which is terminated on outgoing link 103. Two-way trunks which may be used for incoming and outgoing traffic will, of course, have terminations on both incoming and outgoing links. The trunks used in this partiuclar system are four-wire trunks and have separate transmit and receive transmission paths as indicated by the arrows on the heavyweight conductors interconnecting the various components of the trunk.

Figures 1, 11:
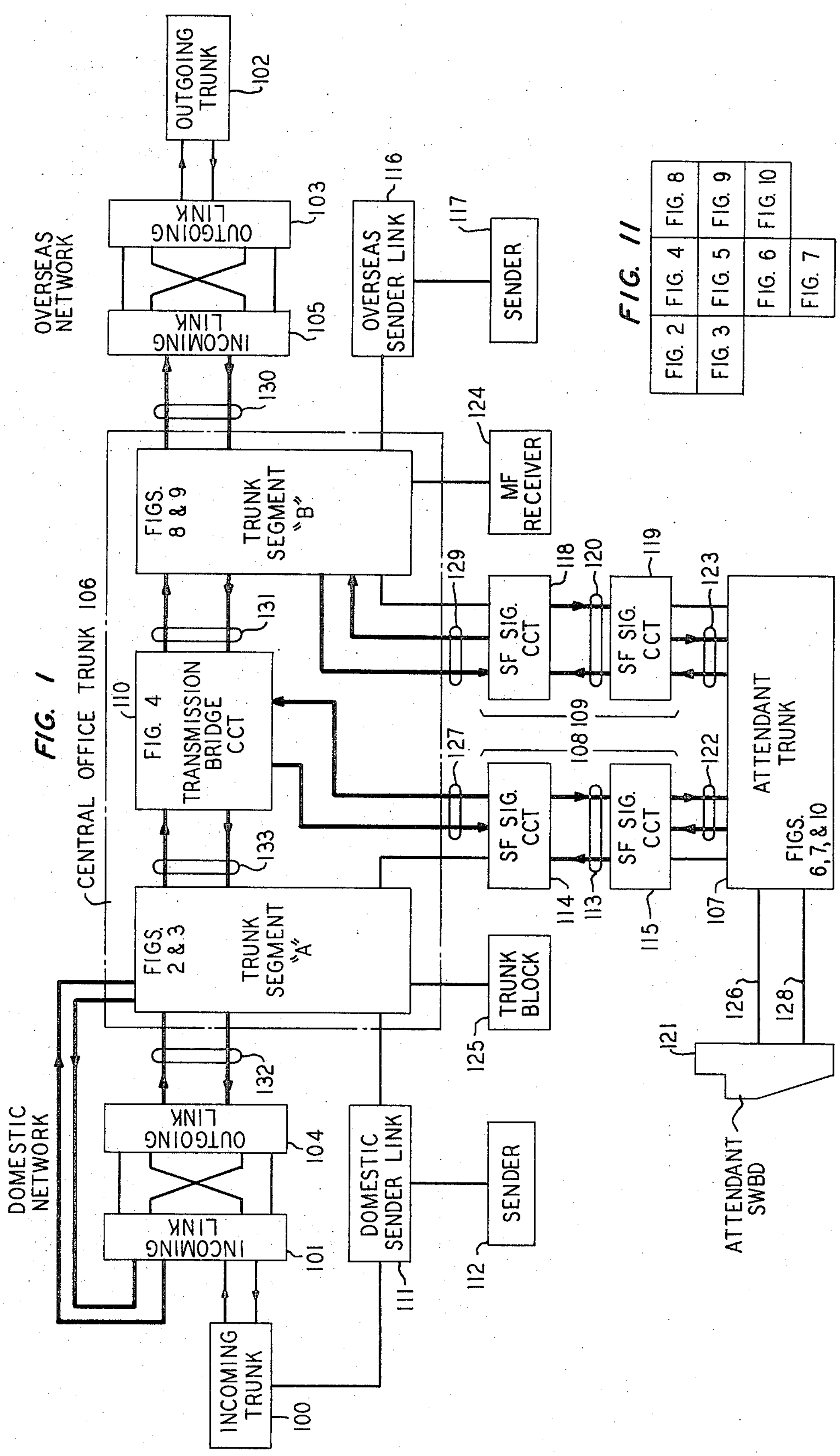
FIG. 1 is a block diagram showing the relationship of the central office trunk and the remote attendant trunk in a typical telephone system.
FIG. 11 shows the arrangement of FIGS. 2–10.

Although the invention is suitable for use with any interoffice call requiring operator assistance, the trunking arrangement as depicted in FIG. 1 is used for international traffic. That is to say, calls originating in a national or domestic network are forwarded over the subject trunk arrangement to a foreign country via an overseas network. In the drawing, the domestic and overseas networks are shown as two separate switch trains. In reality, these networks might use the same incoming and outgoing links with the trunks having access to the appropriate type senders, since overseas traffic may require different senders to be compatible with the senders in a foreign country.

The trunking arrangement is divided into the central office trunk 106 and the remote attendant trunk 107 and these trunks are interconnected via two transmission and control systems designated 108 and 109. The central office trunk 106 can also be functionally subdivided into two segments designated A and B which are coupled together via transmission bridge 110.

Trunk segment A is similar to a two-way trunk in that it has an appearance on both the incoming and outgoing links 101 and 104, respectively, for originating or receiving calls. Segment A also terminates on domestic sender link 111 for access to domestic sender 112.

The transmission and control system 108, which interconnects the remote attendant trunk 107 with the A segment of the central office trunk via transmission bridge 110, comprises a single frequency signaling circuit 114 at the central office end and a single frequency signaling circuit 115 at the switchboard end with the two signaling circuits coupled via transmission facility 113. This facility, of course, may be wire, carrier, or some other suitable facility.

The B segment of central office trunk 106 is similar to an incoming trunk in that it has an appearance on incoming link 105 and overseas sender link 116 for gaining access to overseas sender 117. As mentioned above, the overseas senders may differ from the domestic senders in that the overseas senders have capacity for outpulsing more digits, or they may have different signaling requirements to make them compatible with senders in a foreign country. The B segment of the trunk is coupled to the remote attendant trunk 107 via transmission and control system 109 which includes single frequency signaling circuits 118 and 119 interconnected by a suitable transmission facility 120.

As will be described in more detail below, signaling between the remote attendant trunk 107 and the central office trunk 106 is accomplished by the transmission of multifrequency and single frequency tones. For example, the attendant at swithboard 121 can use her cord circuit to key pulse multifrequency tones directly over transmission conductors 122 and 123 via systems 108 and 109 to the A and B segments, respectively. On the other hand, E and M lead signaling is used to transmit trunk seizure, sender attached, and other signals between attendant trunk 107 and central office trunk 106. If the attendant wishes to reenter a call or ring forward on a connection, special multifrequency tones are generated within attendant trunk 107 and transmitted to multifrequency receiver 124 which then actuates trunk segment B in the proper manner.

To illustrate the operation of the arrangement, let it be assumed that a customer served by the domestic network wishes to place an overseas call and dials the appropriate digits into his local central office equipment. The local office would select a trunk such as 100 incoming to the appropriate overseas toll office (sometimes called a "gateway" office) and a sender 112 would be attached to the trunk via sender link 111. After receiving the digits from the calling office, sender 112 engages the common control equipment (not shown) to process the call. The common control recognizes that this is an overseas call and tests for an idle trunk, using trunk block 125. If it is assumed that trunk 106 is idle, the common control equipment establishes a connection between the outgoing link appearance of trunk segment A and the incoming link appearance of incoming trunk 100. When trunk segment A is seized by the common control equipment, it transmits a seizure over its M lead and system 108 causing a lamp to light at switchboard 121. The attendant at switchboard 121 inserts her answering cord in the appr511orpiate jack to extinguish the lamp and converse with the calling party. The talking path between the calling party and the attendant swithboard includes conductors 126,

122, system 108, conductors 127, transmission bridge 110, conductors 133, circuitry in trunk segment A, conductors 132 and through a network channel in the domestic network to the incoming trunk 100.

Learning of the destination of the call, the attendant inserts a calling cord in the jack associated with the B segment of the trunk and a seizure signal is transmitted over system 109 to trunk segment B. Trunk segment B bids for an idle overseas sender via sender link 116 and when overseas sender 117 is attached, a sender attached signal is sent via system 109 to inform the attendant. The attendant can now key pulse the called number over conductors 128 and 123, system 109, transmission conductors 129 and through trunk segment B and sender link 116 to sender 117. Sender 117 now bids for service by the common control equipment (not shown) serving the overseas network and the common control equipment establishes a connection between trunk segment B and the appropriate outgoing trunk using a network channel through incoming and outgoing links 105 and 103.

At this point in the call the calling customer is connected to trunk segment A and the attendant can converse with the calling customer via transmission bridge 110 and transmission system 108. The attendant can also talk over the called end of the connection via transmission system 109. When the called customer answers, trunk segment B automatically transfers its transmission conductors from transmission system 109 to the transmission bridge 110. The calling and called customers are now interconnected via two ports of the transmission bridge and the attendant is connected over transmission system 108 to the third port, thereby minimizing any transmission degradation in the circuit between the calling and called customers.

Should the attendant wish to reenter the connection to outpulse additional digits or to ring forward on the trunk, the attendant actuates the appropriate key at her switchboard which causes a wink signal to be transmitted over system 109 to trunk segment B. This causes multifrequency receiver 124 to be attached to the trunk and tones are transmitted from attendant trunk 107 to the multifrequency receiver. These tones are translated by the receiver into control signals which actuate relays in trunk segment B to perform the desired operation.

DETAILED DESCRIPTION

Figure 2:
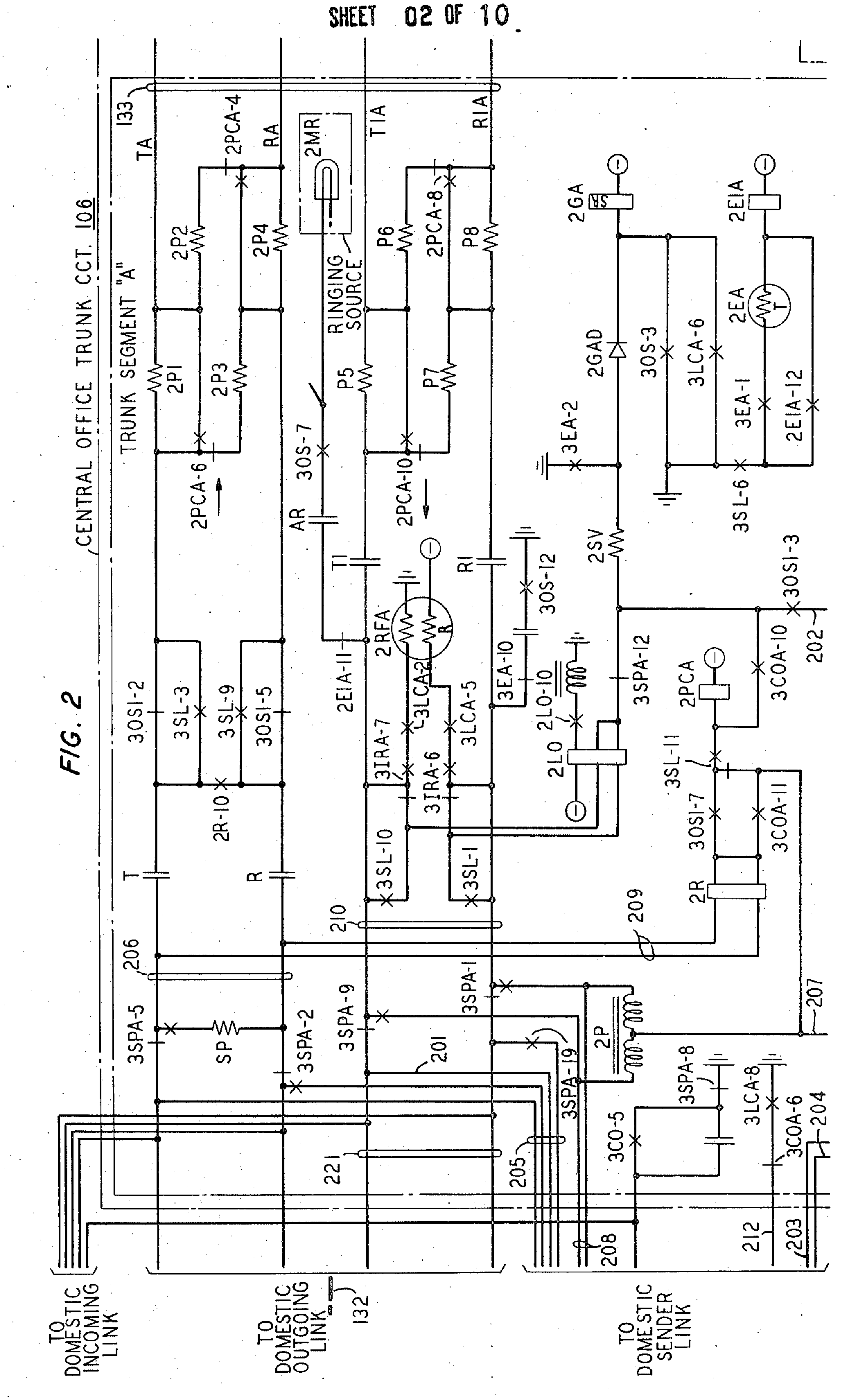
FIGS. 2–10 are schematic diagrams showing in greater detail portions of the central office trunk and the attendant trunk.
Figure 3:
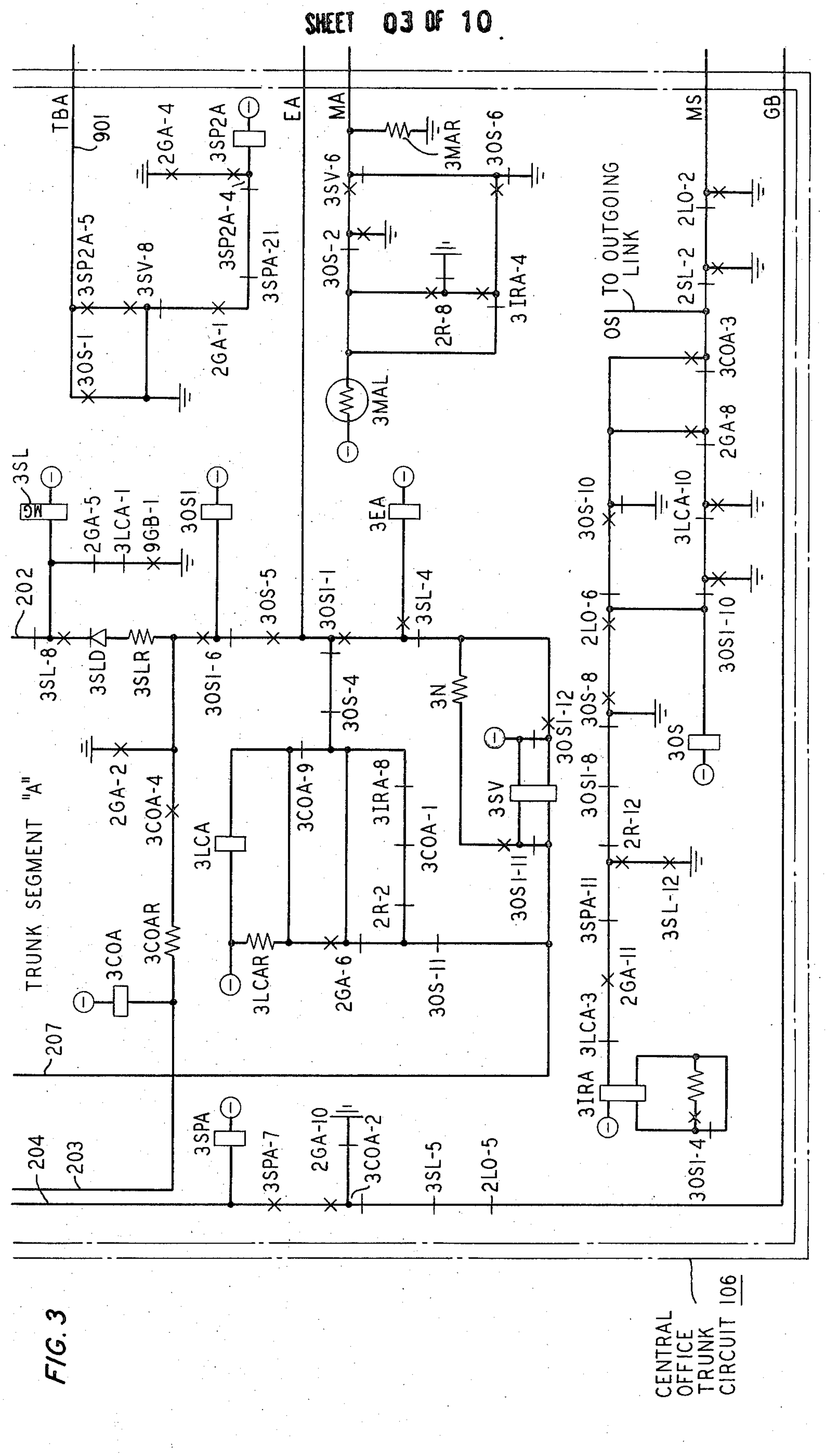
Figure 4:
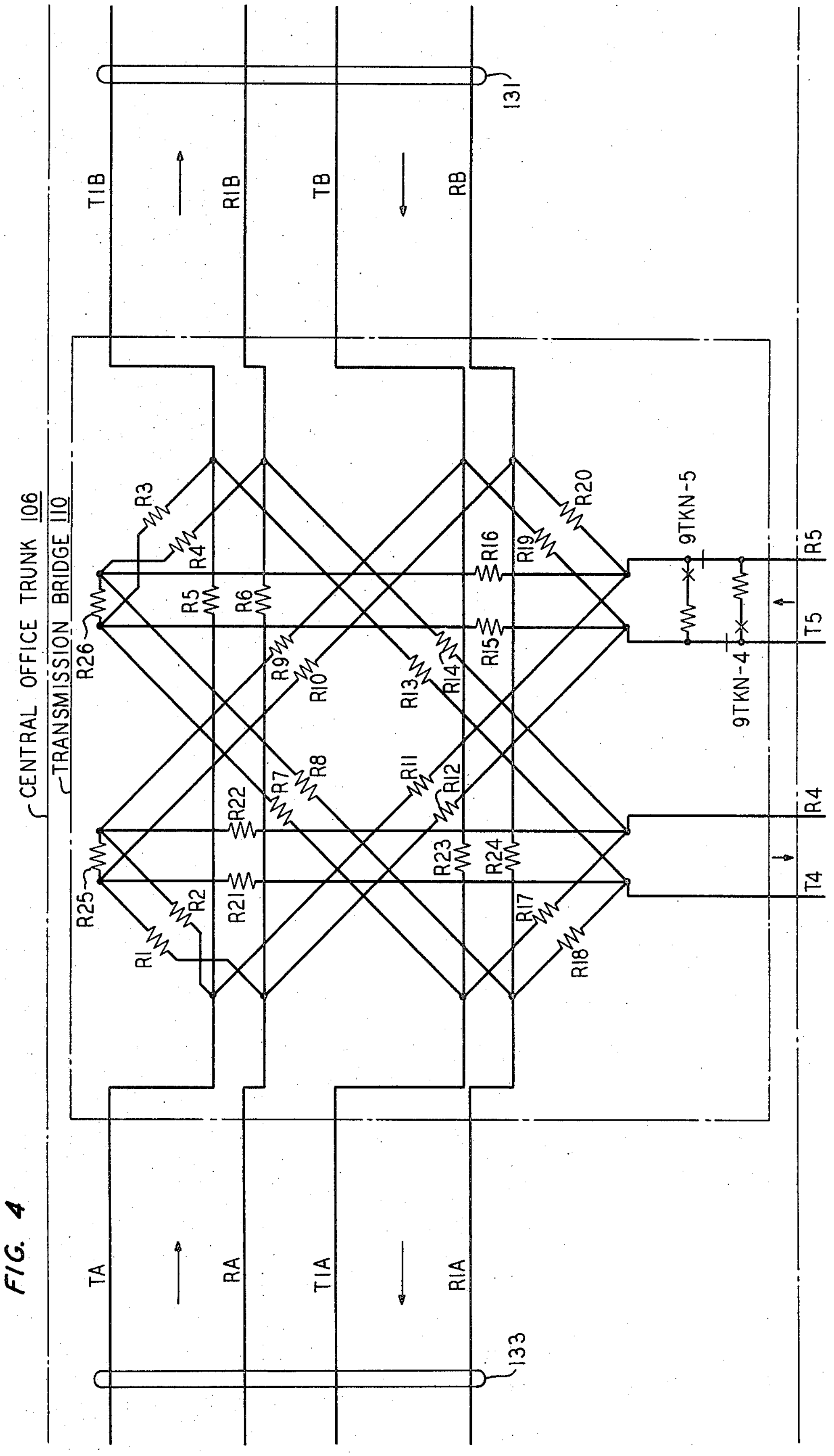
Figure 5:
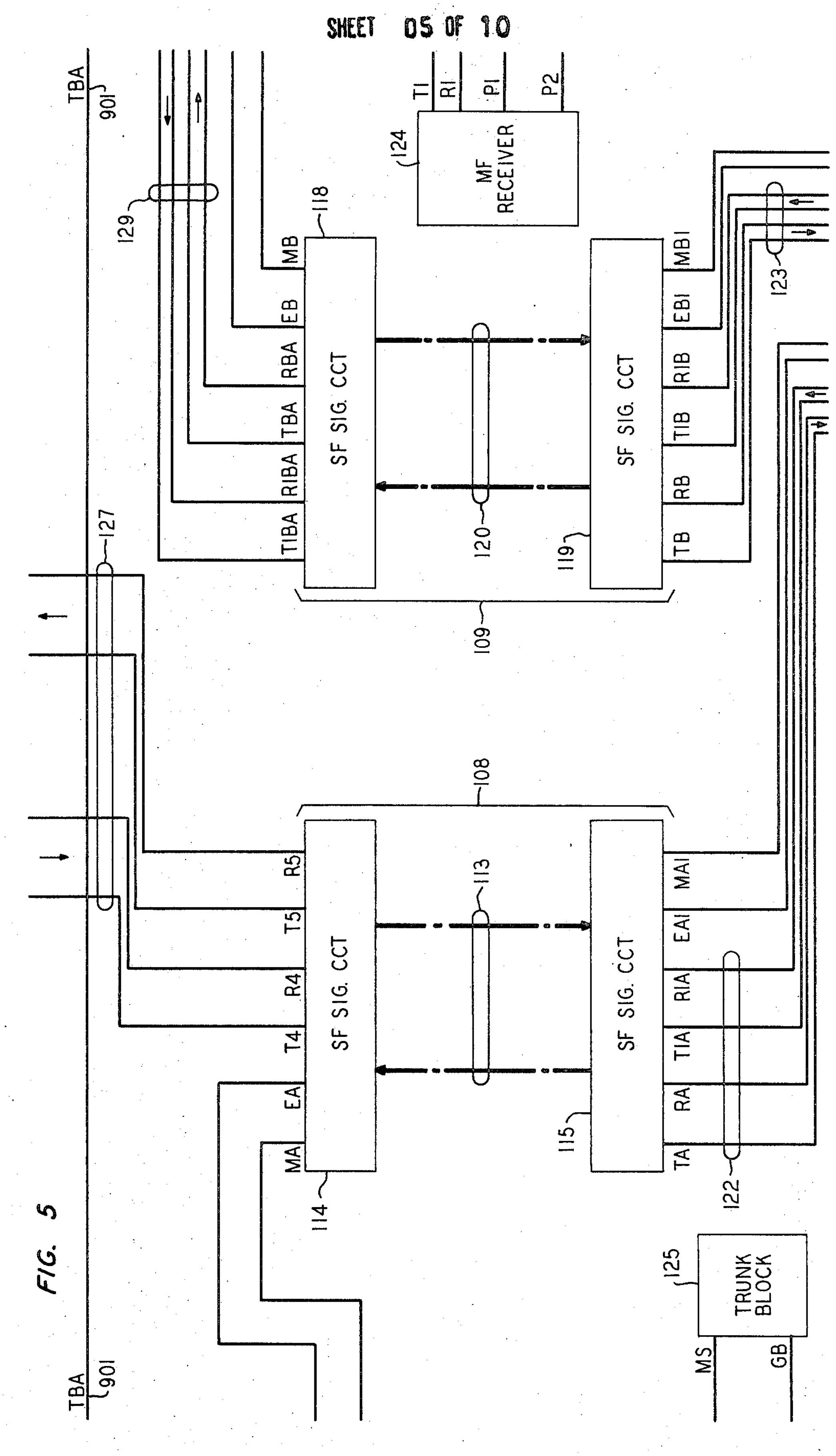
Figure 6:
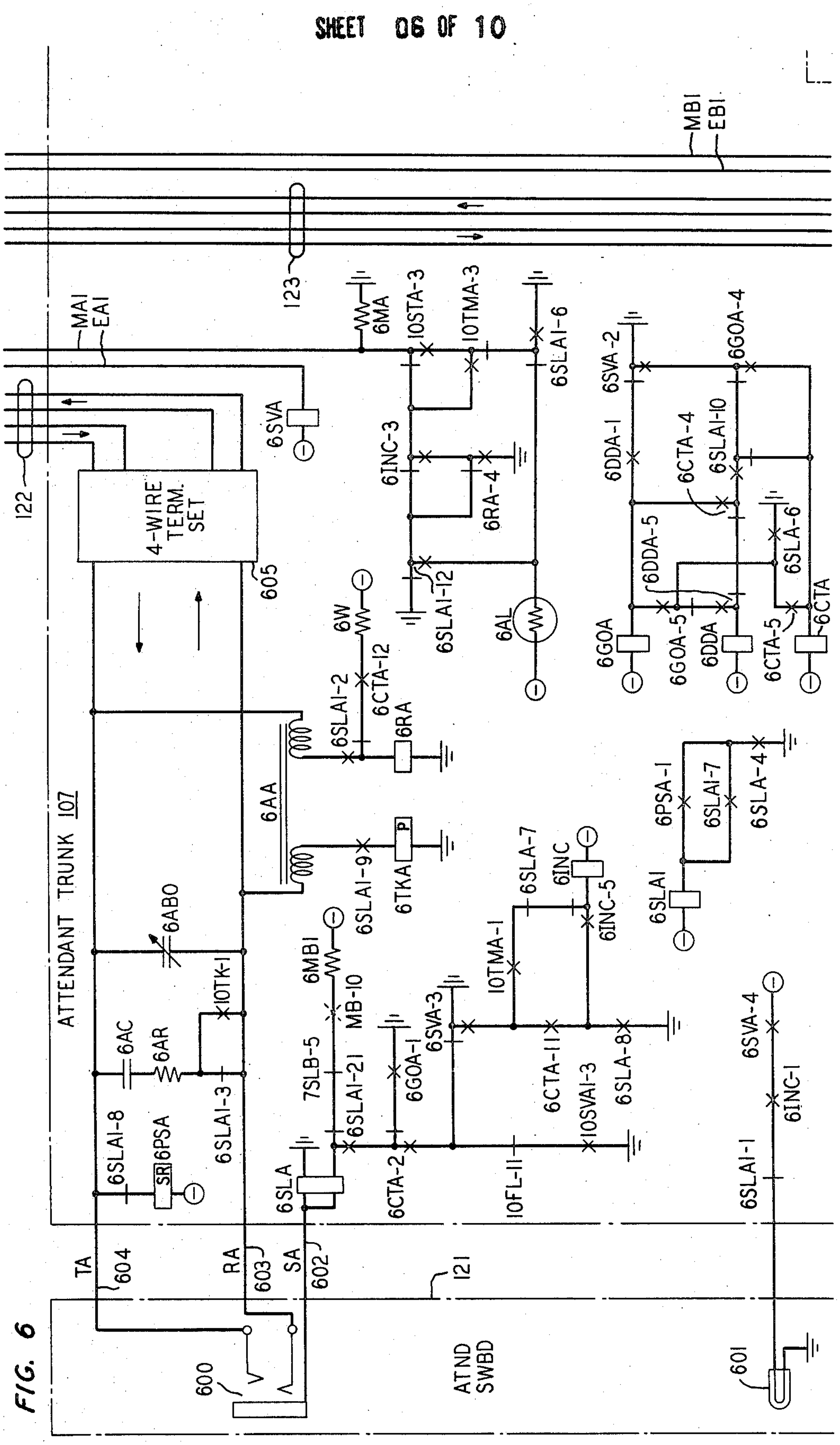
Figure 7:
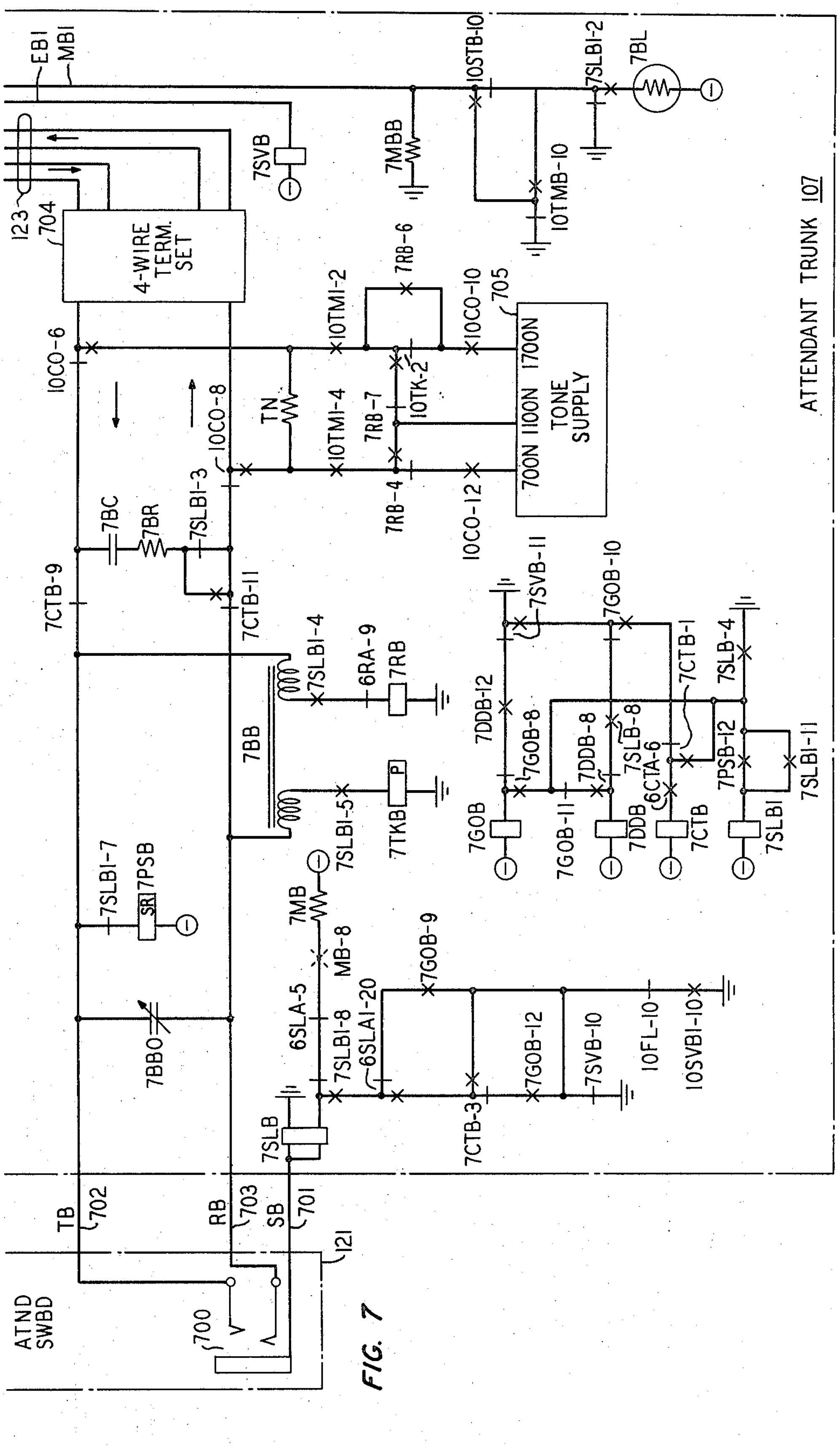
Figure 8:
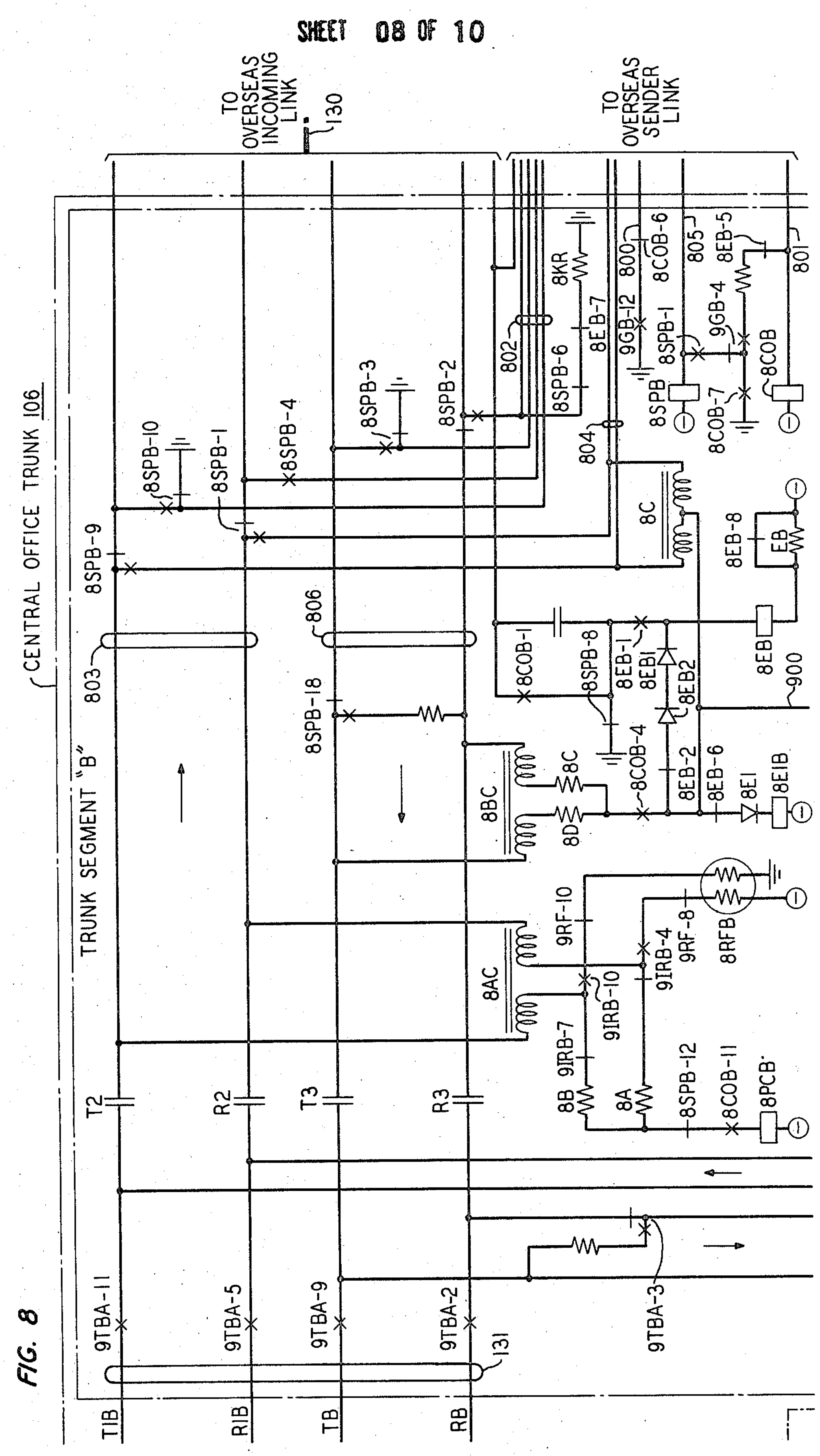
Figure 9:
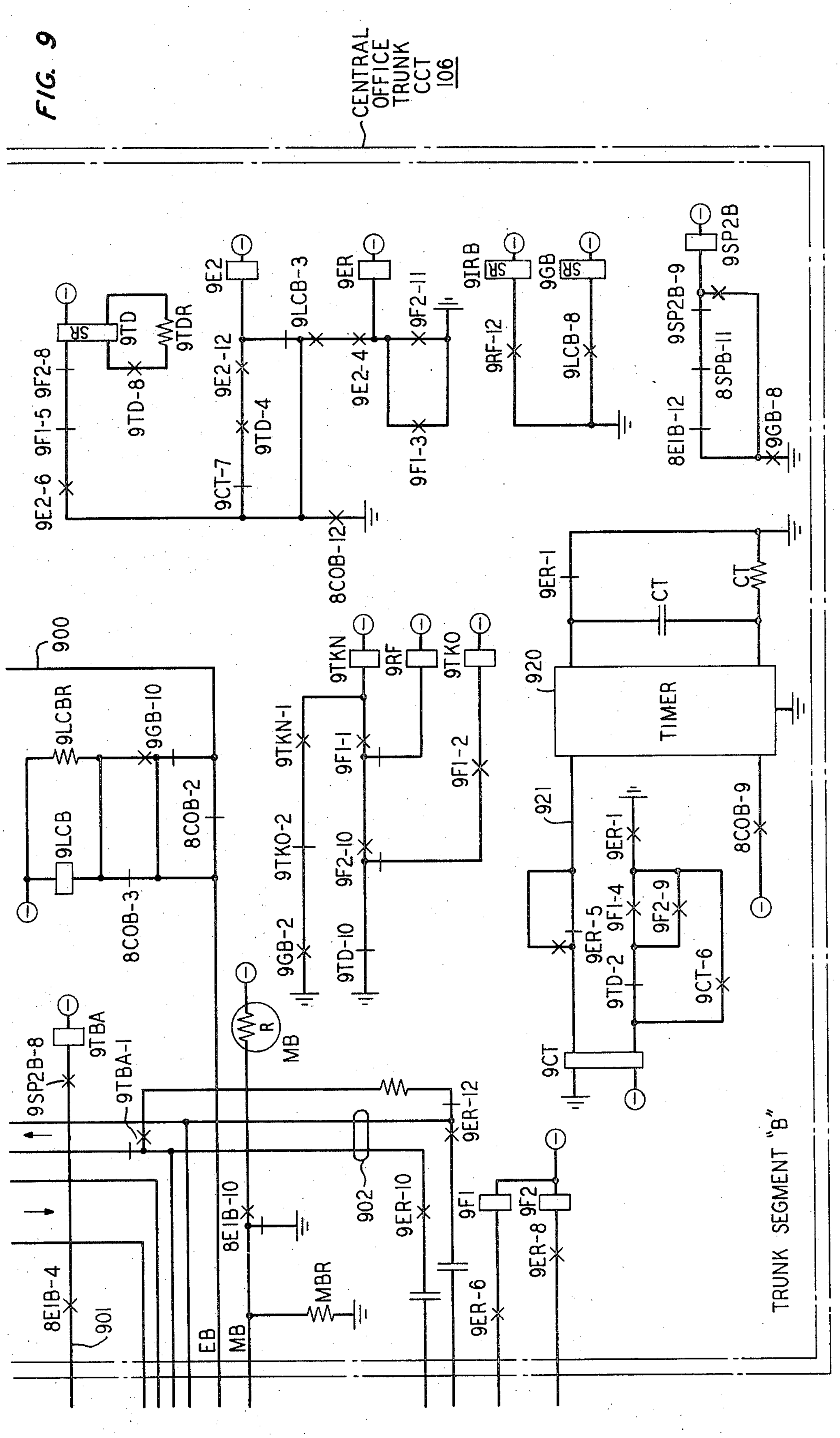
Figure 10:
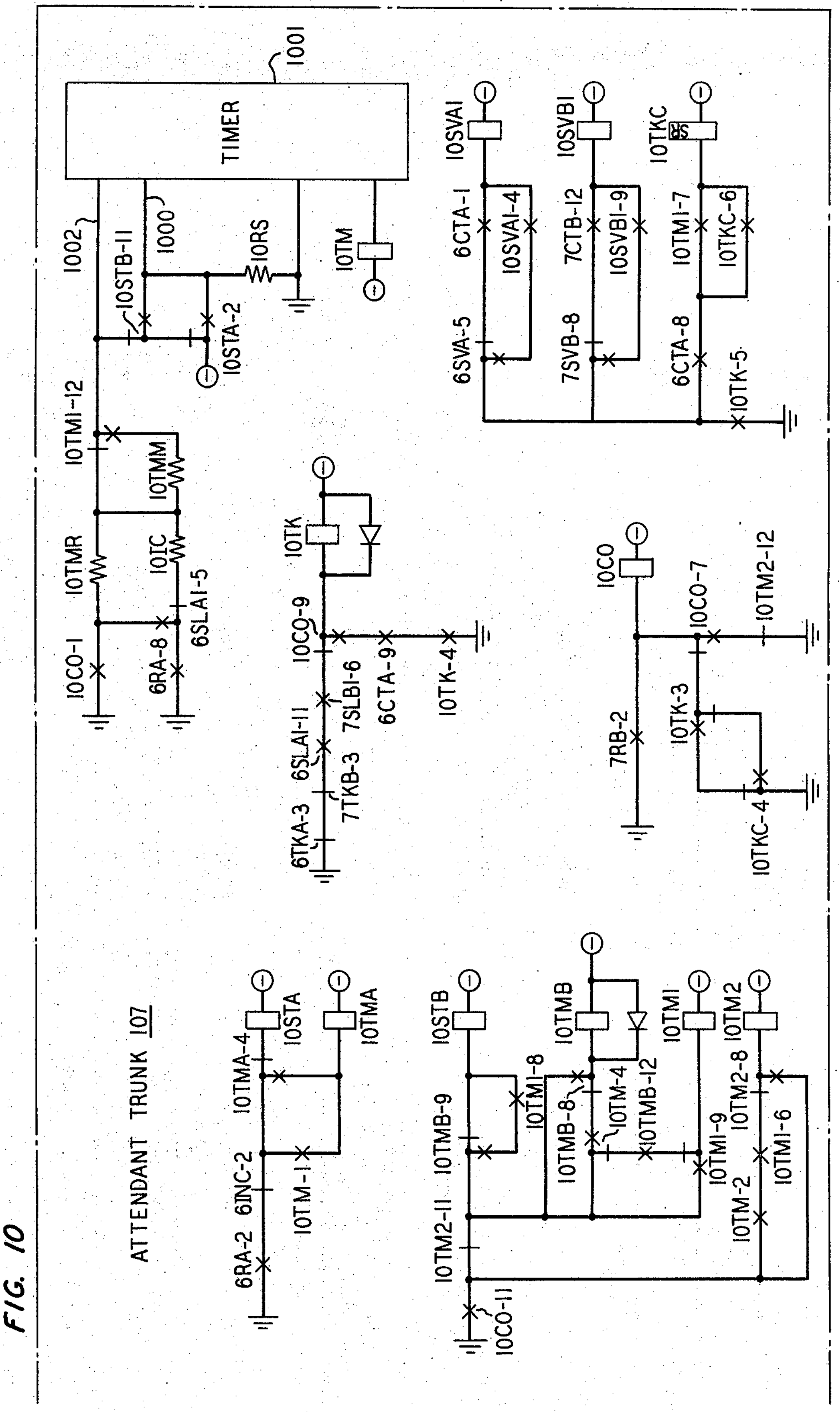

FIGS. 2–10, when arranged according to FIG. 11, depict in more detail, portions of the trunk arrangement disclosed in the block diagram of FIG. 1. More specifically, FIGS. 2 and 3 show a portion of trunk segment A while FIGS. 8 and 9 show a portion of trunk segment B. FIG. 4 shows transmission bridge 110 and FIG. 5 shows the transmission and control system 108 and 109. FIGS. 6, 7 and 10 show the attendant trunk 107 and the associated attendant switchboard.

Whenever possible, the apparatus has been given a combined number and letter reference designation. The number preceding the letter designation, indicates the Figure of the drawing in which the apparatus appears and the letters are generally abbreviations for the function of the apparatus. In some instances where similar relays are associated with each of the A and B segments of the trunk the designation includes the corresponding A or B suffix. The contacts of relays are given the same reference designations as their windings followed by the contact number.

The trunk arrangement disclosed herein can be used in "non hang-up" or "call back" operation. Non hang-up operation involves a call received by the attendant via trunk segment A and forwarded by the attendant over trunk segment B while the calling party is still on the line. If the call cannot be completed within a resonable time, the attendant might request the calling party to hang up, and when the attendant believes that the call can be completed, she will call back the calling customer. This is kown as call-back operation, wherein the attendant originates calls over both segments of the trunk.

TRUNK SEGMENT A SEIZED INCOMING

For the following description, let it be assumed that trunk segment A is idle and will be seized by the common control equipment attempting to connect trunk segment A to a calling customer. Trunk segment A indicates this idle condition by extending ground over its GB lead in FIG. 3 to trunk block 125 in FIG. 5. When trunk segment A is selected, ground is extended from the trunk block 125 over conductor MS through break contacts 2LO-2, 2SL-2, 3COA-3, 2GA-8, 3LCA-10, 30S1-10, and through the winding of relay 30S to operate outgoing seizure relay 3OS. Relay 3OS in operating, closes its contacts 3OS-3 in FIG. 2 to provide an obvious operating circuit for guard relay 2GA. Relay 2GA, in operating, completes a circuit for operating auxiliary splitting relay 3SP2A in FIG. 3. This circuit can be traced from battery through the winding of relay 3SP2A, through break contacts 3SP2A-4 and 3SPA-21, through make contacts 2GA-1 and through break contacts 3SV-8 to ground. Relay 3SP2A is locked operated through make contacts 2GA-4.

When relay 3OS operated it closed its contacts 3OS-7 in FIG. 2 to connect audible ringing from a ringing source 2MR, through capacitor AR and break contacts 2E1A-11 and back over the trunk circuit to the calling customer indicating that the attendant circuit is being rung. The operation of relay 3OS also connected battery over lead MA in FIG. 3 to single frequency signaling circuit 114 in FIG. 5. This circuit can be traced from the battery source connected to ballast lamp 3MAL, through break contacts 3IRA-4, make contacts 3OS-6, break contacts 3SV-6 and over conductor MA to single frequency signaling circuit 114 in FIG. 5.

When battery is connected over lead MA to single frequency signaling circuit 114, the signaling circuit causes the tone to be removed from transmission facility 113 to single frequency signaling circuit 115. This tone removal causes single frequency signaling circuit 115 to ground lead EA1 in FIG. 6, which operates supervisory relay 6SVA in the remote attendant trunk 107. Relay 6SVA, in operating, completes a circuit in FIG. 6 for operating cut-through relay 6CTA. This circuit includes battery through the winding of relay 6CTA, break contacts 6SLA1-10 and 6GOA-4 and through make contacts 6SVA-2 to ground.

When relay 6CTA operates, it operates to make busy relay (not shown) which makes the attendant trunk busy to the attendant switchboard 121. Relay 6CTA also completes an obvious circuit for operating ring relay 6RA in FIG. 6, and relay 6RA extends ground through its contacts 6RA-2 in FIG. 10, through break contacts 6INC-2 and 10TMA-4 and through the winding of relay 10STA to battery thereby operating start timing relay 10STA. At its contacts 10STA-2 in FIG. 10, relay 10STA extends battery over conductor 1000 to start timer 1001. Timer 1001 is used in this instance to time an integrity pulse which is sent to the switching center. This pulse is used by the sender at the switching center to check the integrity of the single frequency signaling circuits between the central office and the remote trunk. Timer 1001 is arranged to time different intervals depending on the ground potential connected over conductor 1002. Under the present circumstances ground is connected from contacts 6RA-8 and through resistance 10IC to conductor 1002 causing timer 1001 to time an interval of approximately 135 milliseconds.

With relay 10STA operated, battery is extended from ballast lamp 6AL in FIG. 6, through break contacts 6SLA1-6 and 10TMA-3, through make contacts 10STA-3 and over conductor MA1 to single frequency signaling circuit 115. Battery will be connected to lead MA1 until timer 1001 times out, operating relay 10TM in FIG. 10. Relay 10TM operates it contacts 10TM-1 to complete an obvious circuit for operating relay 10TMA in FIG. 10 and when relay 10TMA operates, it actuates its transfer contacts 10TMA-3 in FIG. 6 to transfer lead MA1 from battery to ground.

The application of battery on lead MA1 in attendant trunk 107, for this time interval, causes a ground pulse to be transmitted over lead EA to trunk segment A in FIG. 3 through make contacts 3OS-5, break contacts 3OS1-6 and through the winding of relay 3OS1 to battery, operating auxiliary outgoing seizure relay 3OS1 and thereby indicating that the integrity check of the E and M leads between trunk segment A and attendant trunk 107 has been completed.

Recoginizing that it will not be required to outpulse any digits, the sender at the switching office performs certain routine tests and transmits a low resistance simplex ground over conductors 221 in FIG. 2, through break contact 3SPA-9, 3SPA-1, 3IRA-7, 3IRA-6, through the middle and lower windings of relay 2LO, through break contacts 3SPA-12 and make contacts 3OS1-3, over conductor 202 to FIG. 3, through break contacts 3SL-8 and through the winding of sleeve relay 3SL to battery. Relay 3SL operates over this circuit and the sender at the switching center releases.

When relay 10TMA opera es in attendant trunk 107, it also interrupts the operating circuit for relay 10STA which releases, thereby removing the battery connected to timer 1001 and restoring the timer to normal. In FIG. 6 a circuit is now completed for operating incoming relay 6INC. This circuit includes battery through the winding of relay 6INC, break contacts 6INC-5 and 6SLA-7, make contacts 10TMA-1 and 6SVA-3 to ground. Relay 6INC in operating releases relay 10TMA, however, relay 6INC is held locked over its make contacts 6INC-5.

When relay 6INC operates, a circuit is completed for lighting lamp 601 which is associated with jack 600 in the attendant switchboard 121. This lamp signals the operator at the attendant switchboard that there is a call incoming on attendant trunk 107.

ATTENDANT ANSWERS CALL ON TRUNK SEGMENT A

The attendant at switchboard 121 responds by inserting an answering cord into jack 600. Battery from the cord circuit (not shown) is extended over sleeve conductor 602 to operate sleeve relay 6SLA. When the plug of the switchboard cord is fully inserted in jack 600, ground is extended over the tip conductor 604 and through break contacts 6SLA1-8 to operate plug seating relay 6PSA. With both relays 6PSA and 6SLA operated, a circuit is completed for operating auxiliary sleeve relay 6SLA1 which performs several functions at this time. At its contact 6SLA1-8, relay 6PSA is released and at its contacts 6SLA1-2 relay 6SLA1 transfers the winding of relay 6RA from its original operating path to the tip conductor 604. Relay 6RA releases at this time. Make contacts 6SLA1-9 are also closed to connect relay 6TKA to ring conductor 603 and talk relay 6TKA operates from battery on the ring conductor of the cord circuit. By opening its contacts 6SLA1-1, relay 6SLA1 extinguishes lamp 601. Relay 6SLA1 also actuates its transfer contacts 6SLA1-12 to transfer lead MA1 from ground to battery to send an answer signal back over signaling system 108 to central office trunk segment A. In operating, relay 6SLA1 also opens its break contacts 6SLA1-3 to remove a voice frequency termination (6AR, 6AC) from across the tip and ring conductors 604 and 603 associated with the A segment of the trunk, and relay 6SLA1 also transfers cord supervision to relay 6SVA. This is accomplished by contacts 6SLA1-21 in FIG. 6 which transfer the lower winding of relay 6SLA from the battery source at resistance 6MB1 to contacts 6SVA-3. Finally, relay 6SLA1, at its contacts 6SLA1-10, operates start keying relay 6GOA in FIG. 6.

The answer signal from the attendant is returned to the central office trunk segment A in the form of ground on conductor EA which is extended from single frequency signaling circuit 114 in FIG. 5 through make contacts 3OS1-1 and 3SL-4 in FIG. 3 and through the winding of relay 3EA to battery operating relay 3EA. Relay 3EA completes an obvious operating circuit for relay 2E1A in FIG. 2 and relay 2E1A opens its contacts 2E1A-11 to remove the audible ringing source from trunk segment A thereby informing the calling customer that the attendant has answered.

The A segment of the trunk is now in a talking condition and the attendant can communicate with the calling customer over a path including her cord circuit (not shown) tip and ring conductors 604 and 603 in FIG. 6 which are connected through a four-wire terminating set 605 to transmission conductors 122, extending to single frequency signaling circuit 115 in FIG. 5, over signaling system 108 and transmission conductors 127 which are coupled to one port of transmission bridge 110. Transmission conductors 133 in FIG. 2 which couple trunk segment A to another port of the transmission bridge extend the communication path through various components in trunk segment A to the domestic outgoing link via transmission conductors 132. The attendant now ascertains the called number from the calling party and will attempt to complete the call by inserting a calling cord in the jack 700 associated with the B segment of the central office trunk.

ATTENDANT ORIGINATES CALL OVER TRUNK SEGMENT B

When the operator inserts her calling cord (not shown) in the jack 700, battery on the sleeve of the cord is extended over sleeve conductor 701 to operate sleeve relay 7SLB. Also, ground from the tip of the cord is extended over conductor 702 to operate plug seating relay 7PSB. With both relays 7PSB and 7SLB operated, an obvious circuit is completed for operating auxiliary sleeve relay 7SLB1 in FIG. 7.

Relay 7SLB1, in operating, opens its contacts 7SLB1-7 to release relay 7PSB and its contact 7SLB1-3 to remove the voice frequency termination comprising capacitor 7BC and resistance 7BR from the transmission path associated with the B segment of the central office trunk. Relay 7SLB1 also actuates transfer contacts 7SLB1-2 to replace the ground on lead MB1 with a battery potential. The battery potential is extended to single frequency signaling circuit 119 causing the tone to be removed and this tone removal appears as a ground on lead EB in FIG. 5. Ground on lead EB is extended to FIG. 9 and through break contacts 8COB-3 to operate line connect relay 9LCB. The same ground is extended through break contacts 8COB-2 and over conductor 900 through break contacts 8EB-6 to operate relay 8E1B in FIG. 8. Relay 8E1B, in operating, extends battery through its make contacts 8E1B-10 in FIG. 9 over lead MB to single frequency signaling circuit 118 which fowards this signal over signaling system 109, grounding lead EB1 and operating relay 7SVB. Relay 7SVB closes its make contacts 7SVB-11 to extend ground through break contacts 7GOB-10, make contacts 7SLB-8 and break contacts 7DDB-8 to operate delay dial relay 7DDB.

Relay 9LCB closes its make contacts 9LCB-8 in FIG. 9 to complete an obvious circuit for operating guard relay 9GB, and relay 9GB at its contacts 9GB-12 in FIG. 8, extends ground through break contacts 8COB-6 and over start lead 800 to the overseas sender link circuit.

The signal on start lead 800 causes an overseas sender to be attached to the B segment of the trunk and when the sender is attached it returns ground over conductor 801 to operate cut-off relay 8COB. At its contacts 8COB-6, relay 8COB opens the start lead (800) to the sender link and the sender link receives the trunk class information from the trunk over conductors 802. The circuitry for connecting various combinations of potentials over these conductors to transmit the class information has not been shown in detail to simplify the drawing since this arrangment is well known in the art.

Relay 8COB also interrupts the operating circuit for the E lead supervisory relay 8E1B via break contact 8COB-2 in FIG. 9, but this relay remains operated from ground in the sender which is simplexed over conductors 804 and coil 8C.

Having received the trunk class information, the sender signals the trunk that it is ready to receive pulsing by operating the splitting relay 8SPB. Relay 8SPB operates its transfer contacts 8SPB-2, 8SPB-3, 8SPB-4 and 8SPB-10 to couple to the overseas sender the transmission conductors 130 of the trunk which extend to the overseas incoming link circuit. This path will subsequently be used for the overseas sender to outpulse digits to the distant office and for the sender to receiver supervisory signals informing the sender that the appropriate receiving equipment has been attached at the distant office. Relay 8SPB also operates its transfer contacts 8SPB-1 and 8SPB-9 to couple trunk transmission conductors 803 to conductors 804 which extend to the overseas sender. It is over this path that the called number transmitted by the attendant is forwarded to the overseas sender.

When the overseas sender is ready to receive pulses, it removes the ground simplexed on conductors 804 to release relay 8E1B. With relay 8E1B released, ground is connected over lead MB to single frequency signaling circuit 118 in FIG. 5. Ground on this lead causes a tone by contacts 8E1B-10 in FIG. 9 to be transmitted to single frequency signaling circuit 119 which opens lead EB1 and releases supervisory relay 7SVB. When relay 7SVB releases a circuit is completed for operating start keying relay 7GOB. This circuit includes battery through the winding of relay 7GOB, break contacts 7GOB-8, make contacts 7DDB-12 and break contacts 7SVB-11. With relay 7GOB operated, ground is extended from break contact 7SVB-10 in FIG. 7, through make contacts 7GOB-12, break contacts 7CTB-3, make contacts 6SLA1-20 and 7SLB1-8 and through the lower winding of relay 7SLB to the sleeve conductor of the cord circuit. This ground will light the cord circuit lamp (not shown) indicating to the operator that the overseas sender is ready to receive pulses. The operation of relay 7GOB opens its break contacts 7GOB-11 and 7GOB-10, causing the release of delay dial relay 7DDB.

The attendant now keypulses the called number digits and any other digts which may be necessary to forward the call. After all digits have been transmitted the operator depresses her start key to send a start signal to the overseas sender. Upon receipt of the start signal, the overseas sender bids for the common control equipment serving the overseas network and forwards the received digits for translation. The common control equipment then selects an idle outgoing trunk in the appropriate route and interconnects trunk segment B with the selected outgoing trunk via a network channel on the overseas incoming and outgoing links. When this connection is made, a sender is attached at the distant office and this sender signals the near office overseas sender to outpulse the required digits. After outpulsing is completed, the overseas sender in the near office removes ground from conductors 805 causing splitting relay 8SPB to release thereby cutting through the transmission path to the remote attendant switchboard. Relay 8SPB, in releasing, also completes an obvious operating path for relay 9SP2B in FIG. 9.

It will be recalled from the above description that the attendant is connected over her answering cord to trunk segment A and the calling customer via a transmission bridge 110. The attendant is now also directly coupled to the called end of the connection via her calling cord and a communication path comprising tip and ring conductors 702 and 703, four-wire terminating set 704, transmission conductors 123 which extend through FIG. 6 to single frequency signaling circuit 119 in FIG. 5, signaling system 109, transmission conductors 129, which are coupled through capacitors T2, R2, T3 and R3, through conductors 803 and 806 and conductors 130 which are connected through break contacts of the splitting relay 8SPB to the overseas incoming link. The attendant can send additional digits directly over this connection if they are required to complete the call or the attendant can converse with the attendant in a foreign country.

When relay 8COB operated it closed its contacts 8COB-4 in FIG. 8 to complete a circuit from a winding of relay 8E1B, through diode 8E1 to coil 8BC which is connected to trunk conductors 806. It is over this circuit that the trunk can receive answer supervision simplexed from a distant end.

CALLED CUSTOMER ANSWERS ON TRUNK SEGMENT B

Let it now be assumed that the called customer answers and a high resistance ground is simplexed back over the connection to operate relay 8E1B. With relay 8E1B operated, a circuit is now completed for operating trunk bridged access relay 9TBA. This circuit can be traced from battery through winding 9TBA, make contacts 9SP2B-8 and 8E1B-4 over conductor 901 through FIG. 5 to FIG. 3 and through make contacts 3OS-1 to ground. In operating, relay 9TBA closes its contacts 9TBA-2, 9TBA-9, 9TBA-5 and 9TBA-11 in FIG. 8 to couple the B segment of the central office trunk to a port of transmission bridge 110. At its contacts 9TBA-1 in FIG. 9 and 9TBA-3 in FIG. 8, relay 9TBA termintes the previous transmission paths from single frequency signaling circuit 118.

At this point in the call, the calling and called parties can communicate with each other and the attendant can communicate with them via the transmission bridge 110.

When the called customer answered a high resistance ground was simplexed back over the connection to operate relay 8E1B which resulted in the trunk being cut through. Should the call encounter trouble or congestion, a low resistance ground is returned over the same path breaking down zener diode 8EB1 to operate relay 8EB. Relay 8EB opens its contacts 8EB-5 to release relay 8COB and relay 8COB grounds start lead 800 to the overseas sender link. The release of relay 8COB also removes ground from the sleeve of the connection to the overseas incoming link and the cross-office linkages release thereby releasing all connections forward. At its contacts 8EB-7 relay 8EB grounds one of the conductors in group 802 to the sender to inform the sender that a reorder connection is to be established. When the sender is attached, relay 8COB is operated as before, and relay 8COB operates relay 8SPB which releases relay 8EB. The sender proceeds to establish a connection to a reorder trunk in a well-known manner.

ATTENDANT RESTORES TALK KEY

When relay 8E1B operated, as a result of the called party answering, battery was connected over lead MB to signaling circuit 118. This caused ground to be transmitted over conductor EB1 in remote attendant trunk 107 to operate sleeve relay 7SVB. The operation of relay 7SVB removes ground from the lower winding of relay 7SLB and extinguishes the supervisory lamp in the attendant cord circuit. The operation of relay 7SVB also completes a circuit for operating cut-through relay 7CTB. This circuit includes the winding of the relay, make contacts 6CTA-6, break contacts 7CTB-1, make contacts 7GOB-10 and 7SVB-11. At its contact 7CTB-11, relay 7CTB connects a termination across the tip and ring conductors extending to four-wire terminating set 704. The transmission path between the attendant and trunk segment B via system 109 is interrupted at this time but the attendant can still converse with the parties via system 108 and transmission bridge 110.

Upon successful completion of the call, the attendant at switchboard 121 can now release her talk key (not shown). Release of the talk key removes battery from the ring conductors of the cords inserted in jacks 600 and 700 and relays 6TKA and 7TKB release. With both these relays released, a circuit is completed for operating talk relay 10TK. This circuit includes battery through the winding of the relay, break contacts 10CO-9, make contacts 7SLB1-6 and 6SLA1-11 and break contacts 7TKB-3 and 6TKA-3. At its contacts 10TK-1 in FIG. 6, relay 10TK connects a voice frequency termination including capacitor 6AC and resistance 6AR across the four-wire terminating set 605.

Relay 10TK in operating, closes its contact 10TK-3 in FIG. 10 to complete an obvious circuit for operating cutoff relay 10CO. Relay 10CO holds relay 10TK operated through its make contacts 10TK-4 and relay 10CO locks under control of break contacts 10TM2-12. Relay 10CO, in operating, also completes a circuit from ground in FIG. 10 through its make contacts 10CO-11, break contacts 10TM2-11 and 10TMB-9 and through the winding of start timing relay 10STB, thereby operating relay 10STB.

At its make contacts 10STB-10, relay 10STB grounds lead MB1 to signaling circuit 119 to send a momentary wink wink signal to the B segment of central office trunk 106. This wink signal is timed by the operation of timer 1001 which is started when relay 10STB connects ground through its make contacts 10STB-11 to conductor 1000. The timing interval is now determined by ground connected through resistance 10TMR to conductor 1002.

At the end of the timing interval, which is approximately 72 ms in this embodiment, relay 10TM operates and a circuit is completed from battery through the winding of relay 10TMB, break contacts 10TMB-8, make contacts 10TM-4, break contacts 10TM2-11 and make contacts 10CO-11 to ground to operate relay 10TMB. Relay 10TMB releases relay 10STB and lead MB1 is transferred from ground to battery potential thereby ending the wink signal which has an overall duration of about 100 ms in this embodiment. Relay 10STB, in releasing, releases relay 10TM to restore timer 1001 to normal.

At the central office the wink signal takes the form of a momentary removal of ground from lead EB connected to signaling circuit 118. When the ground is initially removed, relay 9LCB releases completing an obvious operating circuit for relay 9E2. The operation of relay 9E2 completes a circuit including make contacts 9E2-6 and break contacts 9F1-5 and 9F2-8 for operating relay 9TD. When the ground is returned to lead EB at the end of the wink signal, relay 9LCB reoperates and a circuit is now completed for operating relay 9ER. This circuit includes battery through the winding of relay 9ER, make contacts 9E2-4 to ground through make contacts 9LCB-3 and 8COB-12.

At its make contacts 9ER-10 and 9ER-12 in FIG. 9, relay 9ER connects multifrequency receiver 124 (FIG. 5) to conductors 902 which are bridged to the received pair of conductors 129.

Meanwhile at the remote trunk in FIG. 10 with relay 10TM released and relay 10TMB operated, a circuit is completed for operating relay 10TM1. This circuit includes battery through the winding of relay 10TM1, break contacts 10TM1-9, make contacts 10TMB-12, break contacts 10TM-4 and 10TM2-11 and make contacts 10CO-11 to ground. Relay 10TM1, in operating, closes its contacts 10TM1-4 and 10TM1-2 in FIG.

7 to connect tone supply 705 to the four-wire terminating set 704. A multifrequency tone burst comprising 700Hz and 1,100Hz is transmitted over conductors 123, signaling system 109, and transmission conductors 129 to multifrequency receiver 124, in FIG. 5. The tone burst is timed by timer 1001 which is started by the operation of relay 10STB and relay 10STB operates upon the operation of relay 10TM1. The time 1001 now operates at a different time interval (approximately 310 ms) since contacts 10TM1-12 alter the resistance of the ground connected to control conductor 1002. Relay 10TM1 in the attendant trunk also completes an obvious circuit for operating talk change relay 10TKC.

At the end of the interval determined by timer 1001, relay 10TM operates and relay 10TM operates relay 10TM2. The operating circuit for relay 10TM2 includes battery through its winding, break contacts 10TM2-8 and make contacts 10TM1-6, 10TM-2 and 10CO-11 to ground. At its contacts 10TM2-11, relay 10TM2 releases relays 10STB, 10TMB and 10TM1 and relay 10STB releases relay 10TM. At its contacts 10TM2-12, relay 10TM2 releases relay 10CO which in turn releases relay 10TM2.

The receipt of the multifrequency tones by receiver 124 in FIG. 5, causes relay 9F1 and 9F2 to operate and this begins the release of slow release relay 9TD in FIG. 9. When relay 9TD releases, the operating path for talk normal relay 9TKN is completed and a path through break contacts 9TD-2 is completed to energize the lower winding of cycle timer relay 9CT which operates at this time. Relay 9TD also opens its make contacts 9TD-4 to release relay 9E2.

When relay 9TKN operates, it actuates its contacts 9TKN-4 in FIG. 4 and 9TKN-5 to open the operators transmit path to bridge circuit 110 and to connect terminations across this path.

At the end of the above described timing interval the tones are removed from the attendant trunk by the release of relay 10TM1. The removal of these tones causes relays 9F1 and 9F2 in the B segment of the trunk to release and these relays release relay 9ER which releases relay 9CT. Relay 9ER also disconnects the multifrequency receiver from the transmission conductors 902

With the talk key released, the transmit pair from the attendant to bridge 110 is interrupted but the attendant can still monitor the connection over her receive pair which is connected to the same port of transmission bridge 110.

In the above description a wink signal was transmitted to cause multifrequency receiver 124 to be attached in order to receive a combination of tones from the remote attendant trunk 107. The operation of relay 9ER, in addition to coupling receiver 124 to conductors 902, also starts timer 920 in FIG. 9. Timer 920 times an interval of approximately 500 ms before forcing the operation of relay 9CT over conductor 921. At its contacts 9CT-7 relay 9CT releases relay 9E2 and relay 9E2 releases relay 9ER to disconnect receiver 124 from conductors 902. This sequence of operations forces receive 124 to be disconnected in the event a false wink signal is received and no tones are transmitted.

ATTENDANT REENTERS CONNECTION

Should the attendant wish to communicate with the calling or called customers, she reoperates her talk key which connects battery to the ring conductors of the cords inserted in jacks 600 and 700 to reoperate relays 6TKA and 7TKB. The operation of either of these relays causes relay 10TK to release and the relase of relay 10TK starts the release of slow release relay 10TKC. Relay 10TK in releasing before the release of relay 10TKC completes a circuit for operating relay 10CO. This circuit includes the winding of relay 10CO, break contacts 10CO-7, break contacts 10TK-3 and make contacts 10TKC-4 to ground.

When relay 10CO operates it completes the previously traced circuit for operating relay 10STB. Relay 10STB starts timer 1001 and grounds lead MB1 to transmit a wink signal to the B segment of the central office trunk.

In the B segment of the trunk, the wink signal causes relay 9ER to operate as described above and relay 9ER couples multifrequency receiver 124 to the transmit path for the attendant trunk circuit.

At the end of the wink signal, relay 10TM1 in the remote attendant trunk circuit is operated to transmit a multifrequency tone burst from the attendant trunk to multifrequency receiver 124 at the central office. Since relay 10TK is now released, the 700 Hz and 1,700 Hz tones are transmitted to trunk segment B.

With the receipt of this combination of tones, multifrequency receiver 124 operates only relay 9F1 which causes relay 9TD to release. With relay 9F2 normal and relay 9F1 operated a circuit is completed for operating talk key operate relay 9TKO. This circuit includes battery through winding of relay 9TKO, make contacts 9F1-2, break contacts 9F2-10 and 9TD-10 to ground. Relay 9TKO, in operating its contacts 9TKO-2, opens the locking circuit for relay 9TKN which releases. At this point the release of relay 9TKN connects the attendant's transmit path to transmission bridge 110 and the attendant can communicate with both parties. When finished, the attendant can release her talking key and, as described above, her transmit path is disconnected from the transmission bridge.

RINGING ON TRUNK

The trunk is arranged so that the attendant can ring forward over trunk segment B or ring back over trunk segment A. The B segment of the trunk is signaled to assume a ringing-forward condition in a manner similar to the way that the trunk is signaled when the attendant operates and releases her talk key.

More specifically, the attendant operates a ringing key associated with her calling cord at switchboard 121 and this connects battery to tip conductor 702 to operate ringing relay 7RB. Relay 7RB completes an obvious operating circuit for operating relay 10CO and, as described above, the operation of relay 10CO begins a sequence of events which causes a wink signal to be transmitted to trunk segment B.

This wink signal causes multifrequency receiver 124 to be attached to the trunk and, as shown in FIG. 7, with relays 7RB and 10CO operated a tone burst comprising 1,700 Hz and 1,100 Hz tones is transmitted to the multifrequency receiver at the central office. The multifrequency receiver responds to these tones by operating only relay 9F2 which releases relay 9TD. With relay 9TD released and relay 9F2 operated, an obvious circuit is completed in FIG. 9 for operating ringing forward relay 9RF.

At its make contacts 9RF-12 in FIG. 9, a circuit is completed for operating incoming ringing relay 9IRB. Relay 9IRB opens its contacts 9IRB-7 and 9IRB-4 to open the operating circuit for pad control relay 8PCB and at its make contacts 9IRB-4 and 9IRB-10, relay 9IRB prepares a path for connecting battery and ground from ballast lamp 8RFB through coil 8AC to conductors 803 This circuit is not completed however, until relay 9RF releases at the end of the tone burst. At the end of the tone burst, relay 9F2 releases, releasing relay 9RF to begin the release of slow release relay 9IRB. While relay 9RF is released and relay 9IRB operated, battery and ground are connected over conductors 803 to the distant office to function as a ringing forward signal. The attendant can repeatedly operate her ringing key to send additional bursts of battery and ground over the trunk.

Generally, a ringing over the A segment of the trunk is performed on a call-back type call which will now be described.

CALL-BACK OPERATION

If the attendant cannot complete the call for the calling customer within a reasonable time, the attendant will ask the calling customer to hang up. When the call can be completed, the attendant will originate connections to both calling and called customers. The attendant can originate the call to either party first and the call over trunk segment B is similar to that described above and need not be reiterated.

Let it be assumed, however, that the attendant wishes to originate a call over trunk segment A and inserts a cord in jack 600. Relays 6PSA, 6SLA and 6SLA1 operate as before and relay 6SLA1 begins the release of slow release relay 6PSA. With relay 6SLA1 operated, battery is connected over lead MA to single frequency signaling circuit 115 and the voice frequency termination is removed from across conductors 603 and 604.

Battery on lead MA1 to signaling circuit 115, causes ground to be transmitted over conductor EA in FIG. 5 through break contacts 3OS-1 in FIG. 3 through break contacts 3OS-4 and 3COA-9 and through the wnding of relay 3LCA to battery operating line connected relay 3LCA. The same ground is extended through break contacts 3IRA-8, 3COA-1, 2R-2, 3OS-11 and 3OS1-11 and through the upper winding of relay 3SV to battery, operating relay 3SV. Relay 3SV connects battery over lead MA to signaling circuit 114 to function as a delay dial signal to the attendant.

When relay 3LCA operates, it closes its make contacts 3LCA-6 in FIG. 2 to complete an obvious circuit for operating relay 2GA and relay 2GA at its break contacts 2GA-10 in FIG. 3, removes ground from lead GB thereby making the trunk test busy. Make contacts 3LCA-8 are closed at this time extending ground through break contacts 3COA-6 and over start lead 212 to the domestic sender link. Ground on start lead 212 is a request for service by the trunk and the sender link response by connecting an appropriate sender to the trunk and transmitting ground back over conductor 203 to operate cut-off relay 3COA in FIG. 3 which opens start lead 212.

When relay 3COA operates it interrupts the original operating circuit for relay 3SV. However, relay 3SV is now held operated to the sender via ground simplexed over conductors 208, through coil 2P and over conductor 207 to the winding of relay 3SV.

At this point, the domestic sender can receive the trunk class information in the form of battery and ground potentials connected over conductors 205. This circuitry is well known in the art and has not been shown to simplify the drawing. After the sender has registered the class information, it transmits ground over conductor 204 to operate splitting relay 3SPA. Splitting relay 3SPA at its make contacts 3SPA-5 in FIG. 2, connects a voice frequency termination across conductors 206. At its transfer contacts 3SPA-1, 3SPA-2, 3SPA-9 and 3SPA-19 is splits the transmission path between trunk segment A and the domestic outgoing link and connects the transmission path to the domestic sender link.

When the domestic sender is ready to receive pulses, it removes the ground from conductor 207 to release relay 3SV. Relay 3SV, in releasing, reconnects ground over lead MA to signal the attendant to start dialing.

At the remote attendant trunk when the delay dial signal was transmitted from trunk segment A, supervisory relay 6SVA operated to operate delay dial relay 6DDA. The path for operating relay 6DDA includes battery through its winding, break contacts 6DDA-4 and 6CTA-4, make contacts 6SLA1-10, break contacts 6GOA-4 and make contacts 6SVA-2 to ground. After the domestic sender is attached and the start dialing signal is transmitted, relay 6SVA releases to operate relay 6GOA through make contacts 6DDA-1. Relay 6GOA in operating, locks thrugh its own make contacts 6GOA-5 and make contacts 6SLA-6. The operation of relay 6GOA also causes the release of relay 6DDa.

When relay 6GOA operates, it closes make contacts 6GOA-1 to connect ground through break contacts 6CTA-2, make contacts 6SLA1-21 and the lower winding of relay 6SLA to the sleeve of the cord at the attendant's position to light the cord lamp, thereby indicating to the attendant that she can begin dialing.

At the end of dialing, the attendant actuates a start key thereby signaling the domestic sender that all digits have been transmitted and the sender then bids for the common control equipment serving the domestic network. The common control equipment selects an outgoing trunk and inerconnects the outgoing trunk with the incoming link appearance of trunk segment A. The domestic sender then outpulses the number keyed in by the attendant and releases. When the sender releases, it releases relay 3SPA which completes a path for operating relay 3SP2A. This path includes ground through break contacts 3SV-8, make contacts 2GA-1, break contacts 3SPA-21 and 3SP2A-4 and through the winding of relay 3SP2A to battery.

Relay 3SPA, in releasing, disconnects the domestic sender from trunk segment A and reconnects trunk segment A with the domestic incoming link appearance. When the customer answers, a ground is simplexed on conductors 206 and extended over conductors 209 through the windings of relay 2R, make contacts 3COA-11 and over conductor 207 to operate supervisory relay 3SV. Supervisory relay 3SV, in operating, signals over lead MA and signaling system 108 to operate relay 6SVA. Relay 6SVA operates relay 6CTA over a path including make contacts 6SVA-2 and 6GOA-4. At its contacts 6CTA-2, relay 6CTA transfers cord supervision to relay 6SVA and the cord lamp at attendant switchboard 121 is extinguished.

In order to ring over trunk segment A during call back operation, the attendant actuates a ringing key associated with her cord to operate ringing relay 6RA. Relay 6RA closes its make contacts 6RA-2 in FIG. 10 to complete an obvious circuit for operating relay 10STA. It will be recalled that relay 10STA connects ground over lead MA1 to signaling circuit 115 and relay 10STA also starts timer 1001. At the end of the time interval determined by timer 1001, relay 10TM operates causing relay 10TMA to operate and reconnect lead MA1 to battery. The momentary ground on lead MA1 causes ground to be momentarily removed from lead EA in FIG. 3, thereby releasing relay 3LCA in trunk segment A. Relay 3LCA in releasing, completes a path from battery through the winding of incoming ringing relay 3IRA, through break contacts 3LCA-3, make contacts 2GA-11, break contacts 3SPA-11, 2R-12, 3OS1-8 and 3OS-8 to ground. When ground is restored to lead EA, relay 3LCA is once again operated to begin to release of relay 3IRA. During the interval that relays 3IRA and 3LCA are both operated, battery and ground are connected from ballast lamp 2RFA in FIG. 2 to conductors 210 which cause the distant trunk to ring the customer's station.

The attendant can also ring back over trunk segment A when a call incoming to the attendant is received over the trunk. The attendant accomplishes this by operating her ringing key to operate relay 6RA. Relay 6RA grounds lead MA1 which causes ground to be removed from conductor EA in FIG. 5 during the interval that the ringing key is held operated. Removal of ground from conductor EA causes relay 3EA to release, thus removing the ground that is simplexed over conductors 210 and 221 via contacts 3EA-2 and the lower and middle windings of relay 2LO. When the attendant restores the ringing key, thereby restoring ground to conductor EA, ground is once again simplexed over conductors 210 and 221 to the originating office. The intermittent removal of the simplexed ground causes the originating office to ring back over the connection in a well-known manner.

What is claimed is:

1. In a telephone system having a plurality of incoming and outgoing trunks and a switching network, an arrangement for interconnecting a pair of said trunks with an attendant switchboard remote from said trunks, said arrangement comprising a multiport transmission bridge, first trunk means for connecting the first trunk of said pair and a first port of said bridge, second trunk means for connecting the second trunk of said pair and a second port of said bridge, first transmission means connecting the remote switchboard to a third port of said bridge, and second transmission means distinct from said frist transmission means for connecting said second trunk means to said remote switchboard.

2. The invention defined in claim 1 wherein said first trunk means comprises a two-way trunk circuit capable of originating and receiving calls over said network, wherein said second trunk means comprises a one-way trunk circuit capable of originating calls over said network, wherein said first transmission means comprises means for controlling said two-way trunk circuit, and wherein said second transmission means comprises means for controlling said one-way trunk circuit.

3. The invention defined in claim 1 further comprising first receiver means connectable to said second trunk means for receiving from the remote switchboard information for forwarding calls over the network, and second receiver means connectable to said second trunk means for receiving from said switchboard information for controlling said second trunk means.

4. The invention defined in claim 1 wherein said second trunk means comprises first means responsive to a first signal received over the second trunk of said pair for transferring the second trunk of said pair between the second port of said bridge and said second transmission means and second means responsive to a second signal received over the second trunk of said pair for disconnecting the second trunk of said pair from said second trunk means.

5. The invention defined in claim 1 wherein said second trunk means comprises means for transferring the second trunk of said pair from said second transmission means to said second port of said bridge.

6. The invention defined in claim 5 wherein said second trunk means also comprises means responsive to a signal transmitted over said second transmission means for disconnecting said first transmission means for said transmission bridge.

7. The invention defined in claim 5 wherein said second trunk means also comprises means responsive to a signal received over said second trunk for actuating said transfer means to disconnect said second transmission means from said second trunk and means responsive to a signal received over said second transmission means for actuating said transfer means to connect said second trunk to said second transmission means.

8. The invention defined in claim 7 wherein said remote attendant switchboard comprises first and second attendant trunk circuits each coupled to corresponding ones of said first and second transmission means, each said attendant trunk circuit comprising means for transmitting seizure signals over said corresponding transmission means to actuate said respective first and second trunk means and wherein each said first and second trunk means comprises means for transmitting supervisory signals over said corresponding transmission means to signal said attendant switchboard.

9. The invention defined in claim 8 further comprising first and second receiver means connectable to said second trunk means, said first receiver means being responsive to called address signals from said second attendant trunk circuit for forwarding calls over said network and said second receiver means being responsive to control signals from said second attendant trunk circuit for controlling said second trunk means.

10. The invention defined in claim 9 wherein said second attendant trunk circuit comprises a multifrequency tone generator for generating said control signals and means for selectively coupling said generator to said second transmission means and wherein said second receiver means comprises a multifrequency receiver and means for connecting said multifrequency receiver to said second transmission means.

11. The invention defined in claim 10 wherein said attendant switchboard also comprises a timing means associated with both said attendant trunk circuits, said timing means comprising first circuit means for causing said second transmitting means to transmit to said second trunk means a wink signal of a first duration and second circuit means for operating said generator coupling means for a second duration.

12. The invention defined in claim 11 wherein said second receiver means also comprises first relay means operative in response to said wink signal for enabling said connecting means, second relay means operative in response to said control signals for registering said signals and third relay means for disabling said first relay means in the event said second relay means fails to operate within a prescribed interval measured from the operation of said first relay means.

13. The invention defined in claim 12 wherein said third relay means includes a timer circuit actuated by said first relay means.

14. In a telephone system having a plurality of trunks connected to a switching network and control means for actuating said network wherein the trunks are divided into a plurality of groups each serving a distinct class of traffic, an arrangement for interconnecting a trunk from each of a first and a second one of said groups under the control of a remote attendant switchboard comprising a multiport transmission bridge, a two-way trunk circuit interconnecting a first port of said bridge with said network for originating calls to and receiving calls from said first trunk group, a one-way trunk circuit connected to said network for originating calls to said second trunk group, first transmission means interconnecting said two-way trunk circuit and a second port of said bridge with said remote switchboard, second transmission means interconnecting said one-way trunk circuit with said remote switchboard, means for signaling from said remote switchboard over said first transmission means to effect a network connection between one of said first group trunks and said two-way trunk circuit, means for signaling from said remote switchboard over said second transmission means to effect a network connection between one of said second group trunks and said one-way trunk circuit, transfer means jointly actuated by said trunk circuits for transferring said one-way trunk from said second transmission means to a third port of said transmission bridge, and means actuated by a control signal transmitted over said second transmission means from said remote switchboard for disconnecting said first transmission means from said bridge.

* * * * *

UNITED STATES PATENT OFFICE
CERTIFICATE OF CORRECTION

Patent No. 3,804,991 Dated April 16, 1974

Inventor(s) Ronald W. Hammond, Robert M. Morris, Richard J. Powondra, and Alexander R. Ross It is certified that error appears in the above-identified patent and that said Letters Patent are hereby corrected as shown below:

In paragraph [73] the assignee's address "Berkeley Heights" should read --Murray Hill, Berkeley Heights--.

Column 2, line 4, "processoer" should read --processor--; line 15, "out" should read --our--. Column 3, line 43, "partiuclar" should read --particular--. Column 4, line 68, "swithboard" should read --switchboard--. Column 5, line 56, "system" should read --systems--. Column 6, line 12, "kown" should read --known--. Column 7, line 37, "Recoginizing" should read --Recognizing--; line 48, "opera es" should read --operates--. Column 9, line 63, "receiver" should read --receive--. Column 10, line 6, after "MB" insert --by contacts 8E1B-10 in FIG. 9--; line 8, delete "by contacts 8E1B-10 in FIG. 9"; line 27, "digts" should read --digits--; line 42, "conductors" should read --conductor--. Column 12, line 24, second "wink" should be deleted. Column 13, line 8, "time" should read --timer--; line 35, "in FIG. 4" should be deleted and inserted after "9TKN-5". Column 15, line 44, "wnding" should read --winding--. Column 16, line 13, "is" should read --it--; line 25, "6DDA-4" should read --6DDA-5--; line 31, "thrugh" should read --through--; line 33, "6DDa" should read --6DDA--; line 45, "inerconnects" should read --interconnects--. Column 17, line 20, the second "to" should read --the--; line 57, "frist" should read --first--. Column 18, line 28, "for said" should read --from said--.

Signed and sealed this 12th day of November 1974.

(SEAL)
Attest:

McCOY M. GIBSON JR.
Attesting Officer

C. MARSHALL DANN
Commissioner of Patents